US011844432B2

(12) United States Patent
Womack et al.

(10) Patent No.: US 11,844,432 B2
(45) Date of Patent: Dec. 19, 2023

(54) FURNITURE MOTION CONTROL SYSTEM

(71) Applicant: La-Z-Boy Incorporated, Monroe, MI (US)

(72) Inventors: Robert B. Womack, Chattanooga, TN (US); Amee Mayur Patel, Rockwood, TN (US); Jason Baker, Ooltewah, TN (US); Robert C. Beilfuss, Spring City, TN (US)

(73) Assignee: La-Z-Boy Incorporated, Monroe, MI (US)

( * ) Notice: Subject to any disclaimer, the term of this patent is extended or adjusted under 35 U.S.C. 154(b) by 112 days.

(21) Appl. No.: 17/197,404

(22) Filed: Mar. 10, 2021

(65) Prior Publication Data

US 2021/0298477 A1 Sep. 30, 2021

Related U.S. Application Data

(60) Provisional application No. 63/000,750, filed on Mar. 27, 2020.

(51) Int. Cl.
*A47C 1/024* (2006.01)
*A47C 17/04* (2006.01)
*G05B 19/042* (2006.01)

(52) U.S. Cl.
CPC ............ *A47C 1/0242* (2013.01); *A47C 17/04* (2013.01); *G05B 19/042* (2013.01);
(Continued)

(58) Field of Classification Search
CPC ...... A47C 1/0242; A47C 17/04; G05B 19/042
(Continued)

(56) References Cited

U.S. PATENT DOCUMENTS 4,001,661 A  1/1977 Terabayashi
4,678,975 A  7/1987 Vrabel et al.
(Continued)

FOREIGN PATENT DOCUMENTS

JP  2002-017494 A  1/2002
JP  2011-229715 A  11/2011
(Continued)

OTHER PUBLICATIONS

Manual, Instruction. "Osaki." (2006). (Year: 2006).*
(Continued)

*Primary Examiner* — Mohammad Ali
*Assistant Examiner* — Joshua T Sanders
(74) *Attorney, Agent, or Firm* — Harness, Dickey & Pierce, P.L.C.

(57) ABSTRACT

A furniture motion control system for controlling movement of one or more movable parts of a furniture member includes a panel including one or more buttons; an actuator configured to control movement of the one or more movable parts of the furniture member; an electric motor configured to drive the actuator; and control circuitry configured to control the electric motor, wherein the control circuitry is configured to, in response to detecting that a first button, from among the one or more buttons, has been pressed, select between controlling the motor to drive the actuator and the one or more movable parts to move automatically and controlling the motor to drive the actuator and the one or more movable parts to move manually, based on a length of time the first button is held.

17 Claims, 6 Drawing Sheets

(52) U.S. Cl.
CPC .............. *G05B 2219/25252* (2013.01); *G05B 2219/25257* (2013.01); *G05B 2219/2613* (2013.01); *G05B 2219/2642* (2013.01)

(58) Field of Classification Search
USPC ........................................................ 700/275
See application file for complete search history.

(56) References Cited

U.S. PATENT DOCUMENTS

| | | | |
|---|---|---|---|
| 4,870,333 | A | 9/1989 | Itoh et al. |
| 5,543,693 | A | 8/1996 | Janca et al. |
| 5,691,580 | A | 11/1997 | Shelby |
| 5,877,955 | A | 3/1999 | Struyk |
| 6,612,761 | B2 | 9/2003 | Iura et al. |
| 6,657,407 | B2 | 12/2003 | Lutter et al. |
| 7,030,589 | B2 | 4/2006 | Kaneko et al. |
| 7,064,509 | B1 | 6/2006 | Fu et al. |
| 7,668,690 | B2 | 2/2010 | Schneider et al. |
| 8,058,824 | B2 | 11/2011 | Williams et al. |
| 8,115,428 | B2 | 2/2012 | Williams et al. |
| 8,354,808 | B2 | 1/2013 | Uebel et al. |
| 9,071,184 | B2 | 6/2015 | Kuroda et al. |
| 9,093,933 | B2 | 7/2015 | Jang et al. |
| 9,160,260 | B1 | 10/2015 | Keas |
| 9,270,216 | B2 | 2/2016 | Knezevic |
| 9,455,656 | B2 | 9/2016 | Dixon et al. |
| 9,713,387 | B2 | 7/2017 | Hille |
| 9,825,564 | B2 | 11/2017 | Magee et al. |
| 9,866,156 | B2 | 1/2018 | Nishiyama |
| 9,990,590 | B2 | 6/2018 | Kawai et al. |
| 10,064,784 | B2 | 9/2018 | Rawls-Meehan |
| 10,334,951 | B2 | 7/2019 | Robertson et al. |
| 10,512,331 | B2 | 12/2019 | Zhang |
| 10,536,100 | B2 | 1/2020 | Jordan et al. |
| 10,693,399 | B2 | 6/2020 | Yanagita |
| 10,763,771 | B2 | 9/2020 | Kwak et al. |
| 10,864,137 | B2 | 12/2020 | Rawls-Meehan |
| 2004/0251860 | A1 | 12/2004 | Ehsani et al. |
| 2006/0087159 | A1* | 4/2006 | Sheldon ............... A47C 1/0342 297/30 |
| 2009/0114471 | A1* | 5/2009 | Nagase ................ B62D 5/0487 180/446 |
| 2011/0298302 | A1 | 12/2011 | Pitigoi-Aron |
| 2014/0001815 | A1 | 1/2014 | Tanaka et al. |
| 2015/0214871 | A1 | 7/2015 | Saglime, III |
| 2015/0306977 | A1 | 10/2015 | Wu et al. |
| 2015/0311839 | A1 | 10/2015 | Wu et al. |
| 2017/0112716 | A1 | 4/2017 | Rawls-Meehan |
| 2017/0332804 | A1 | 11/2017 | Rom |
| 2018/0271287 | A1* | 9/2018 | Jacobs ................... A47C 1/124 |
| 2018/0332966 | A1 | 11/2018 | Lohken et al. |
| 2018/0352959 | A1 | 12/2018 | Zhang |
| 2020/0119670 | A1 | 4/2020 | Jordan et al. |
| 2020/0305605 | A1 | 10/2020 | Womack et al. |

FOREIGN PATENT DOCUMENTS

| | | |
|---|---|---|
| KR | 10-2011-0122607 A | 11/2011 |
| KR | 10-2014-0121224 A | 10/2014 |
| TW | 2003-06165 A | 11/2003 |

OTHER PUBLICATIONS

International Search Report and Written Opinion for Application No. PCT/US2021/023432 dated Jul. 12, 2021.

Abacan, Aldrin et al., "Sensorless Position Control of Brushed DC Motor Using Ripple Counting Technique." AN3049, Application Note, Microchip Technology Inc. (May 14, 2019).

Microchip, "High-Accuracy, High-Side, Adjustable Current-Limit Power Switch." MIC2039, Datasheet, Microchip Technology Inc. (Oct. 25, 2017).

Texas Instruments, "Automotive Brushed-Motor Ripple Counter Reference Design for Sensorless Position Measurement." TIDA-01421, User Guide, Texas Instruments Incorporated (Jun. 14, 2018).

* cited by examiner

FURNITURE MOTION CONTROL SYSTEM

CROSS-REFERENCE TO RELATED APPLICATIONS

This application claims the benefit of U.S. Provisional Application No. 63/000,750 filed on Mar. 27, 2020. The entire disclosure of the application referenced above is incorporated herein by reference.

FIELD

The present disclosure relates to furniture having a moving member, and, more particularly, to a system for controlling motion of furniture member.

BACKGROUND

This section provides background information related to the present disclosure and is not necessarily prior art.

Furniture members (e.g., chairs, sofas, loveseats, etc.) can include a leg rest that can be extended and retracted and a seatback that can be reclined. Some furniture members include electric motors that drive movement of the furniture members in response to control input from a user.

SUMMARY

This section provides a general summary of the disclosure, and is not a comprehensive disclosure of its full scope or all of its features.

According to at least some examples, a furniture motion control system for controlling movement of one or more movable parts of a furniture member includes a panel including one or more buttons; an actuator configured to control movement of the one or more movable parts of the furniture member; an electric motor configured to drive the actuator; and control circuitry configured to control the electric motor, wherein the control circuitry is configured to, in response to detecting that a first button, from among the one or more buttons, has been pressed, select between controlling the motor to drive the actuator and the one or more movable parts to move automatically and, controlling the motor to drive the actuator and the one or more movable parts to move manually, based on a length of time the first button is held.

In some examples, the control circuitry is configured to, in response to determining that the first button is pressed, initiate a timer to determine the length of time the first button is pressed and control the motor to drive the actuator to move the one or more movable parts. Further, the control circuitry is configured to control the motor to stop driving the actuator when the first button is released and the length of time the first button is held is less than a key held threshold value.

In other examples, the control circuitry is configured to, when the first button is released and the length of time the first button is held is greater than the key held threshold value, control the motor to drive the actuator and the one or more movable parts to move automatically.

In another aspect of the disclosure, a method of operating a furniture motion control system for controlling movement of one or more movable parts of a furniture member is set forth. The system includes a panel including one or more buttons, an actuator configured to control movement of the one or more movable parts of the furniture member, an electric motor configured to drive the actuator, and control circuitry configured to control the electric motor. The method includes, in response to detecting that a first button, from among the one or more buttons, has been pressed, selecting between controlling the motor to drive the actuator and the one or more movable parts to move automatically and controlling the motor to drive the actuator and the one or more movable parts to move manually, based on a length of time the first button is held.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected examples and not all possible implementations, and are not intended to limit the scope of the present disclosure.

DETAILED DESCRIPTION

Figure 1:
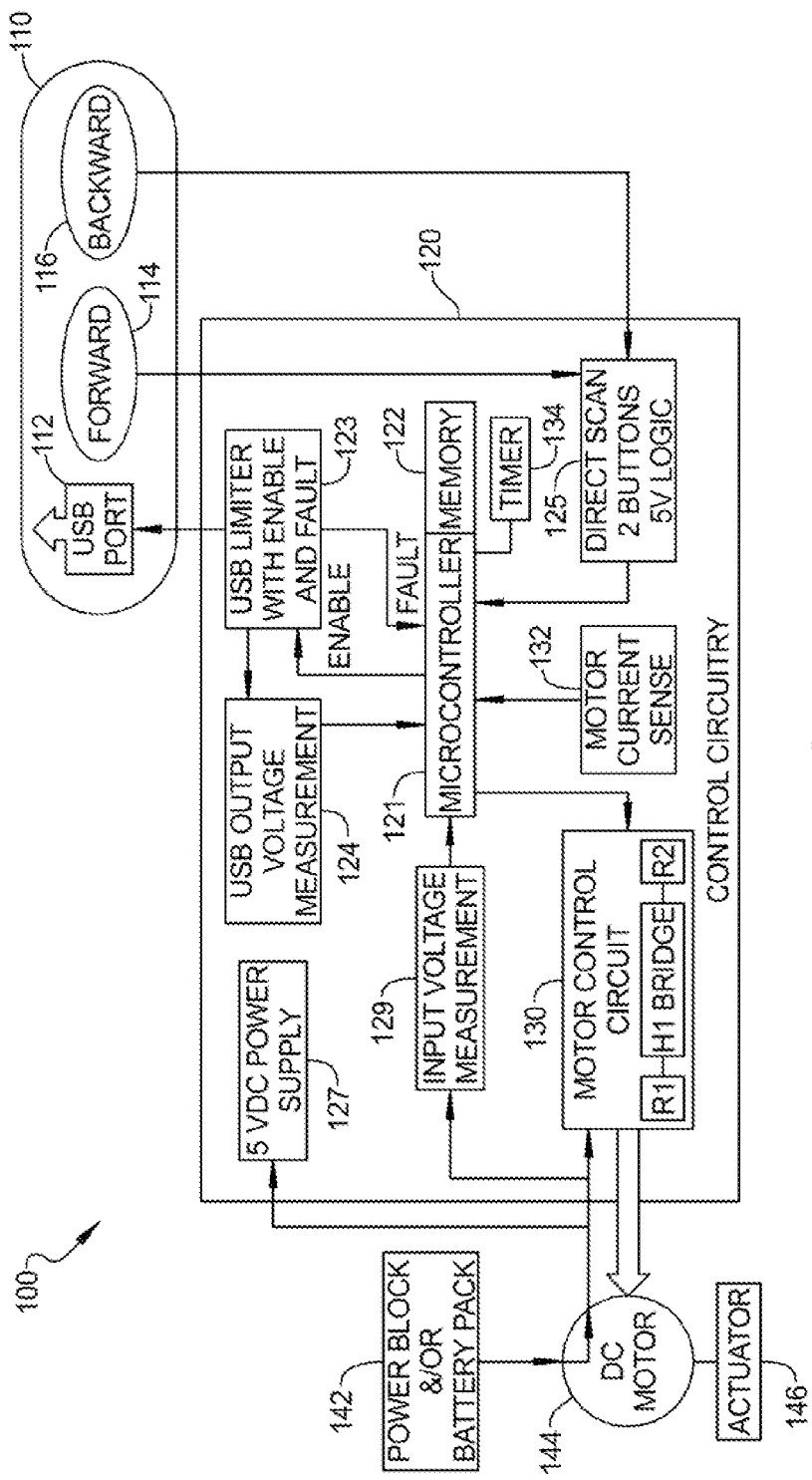
FIG. 1 illustrates the furniture motion control system according to at least some examples.
Figure 2:
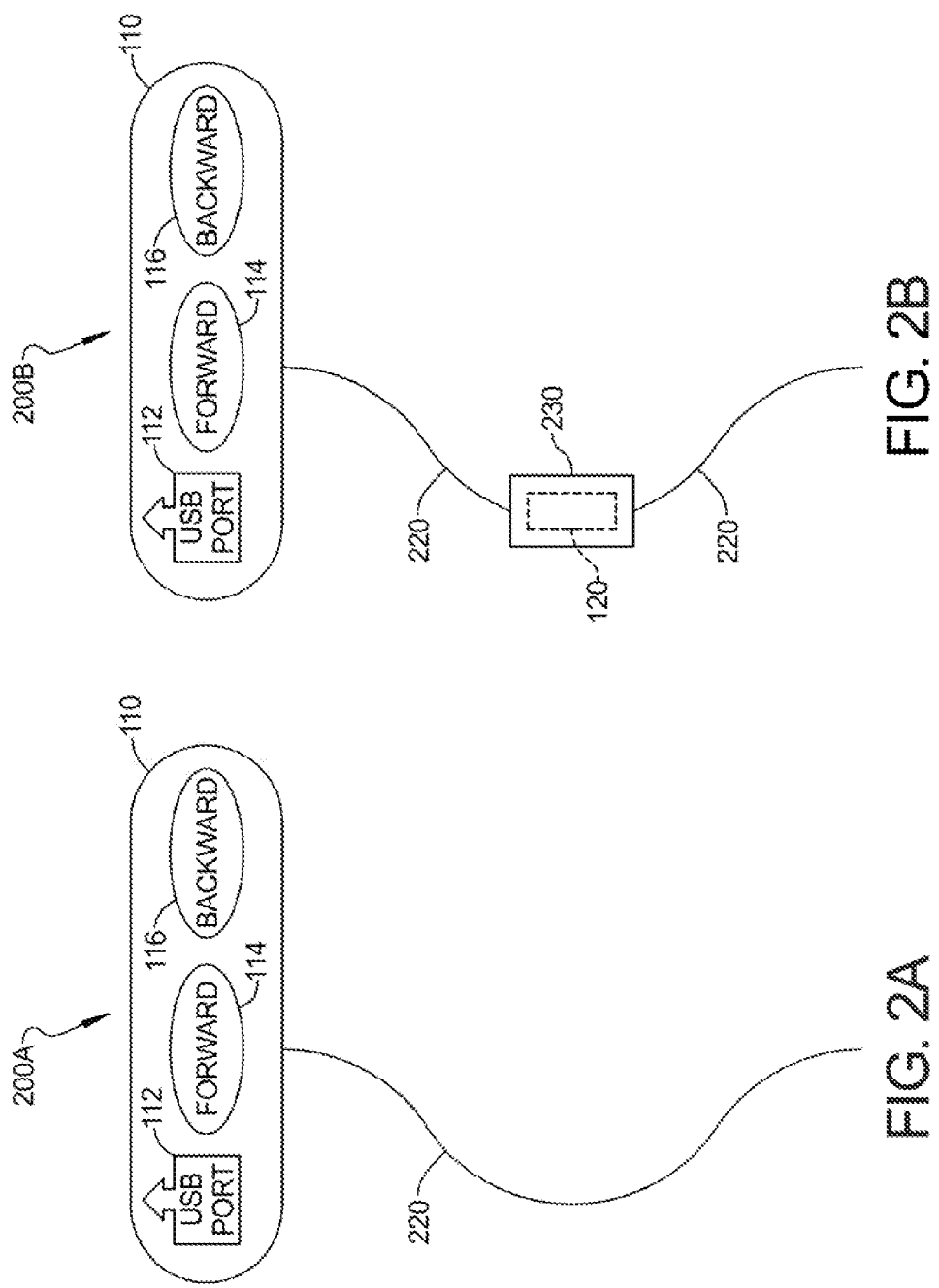
FIG. 2A illustrates a first example of a control module included in the furniture motion control system of FIG. 1.
FIG. 2B illustrates a second example of the control module included in the furniture motion control system of FIG. 1.

Examples will now be described more fully with reference to the accompanying drawings.

Examples are provided so that this disclosure will be thorough, and will fully convey the scope to those who are skilled in the art. Numerous specific details are set forth such as examples of specific components, devices, and methods, to provide a thorough understanding of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The terminology used herein is for the purpose of describing particular examples only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the examples.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. As is discussed in greater detail, the requirements generation device implements a requirements identifying process that reduces a number of questions needed to identify which requirements, among a plurality of existing potential requirements, are requirements of a particular project.

According to at least some examples, a control interface of a furniture motion control system for controlling the movement of one or more movable parts of a furniture member (e.g., a chair, sofa, loveseat, etc.) may include two directional buttons (e.g., a forward button and a backward button). According to at least some examples, in response to one of the directional buttons being pressed for an elapsed amount of time that is less than a threshold period of time, the furniture motion control system causes one or more movable parts of the furniture member (e.g., a leg rest of a sofa) to move in the direction associated with the pressed directional button, manually (i.e., movement of the movable part(s) starts in response to the directional button being pressed and stops in response to the directional button being released). Further, according to at least some examples, in response to one of the directional buttons being pressed for an elapsed time period greater than the threshold period of time, the furniture motion control system causes the movable part(s) of the furniture member to move in the direction associated with the pressed directional button, automatically (i.e., movement of the movable part(s) starts in response to the directional button being pressed and continues until a stopping event is determined, without stopping in response to the directional button being released). Further, during the automatic movement of the movable part(s), the furniture motion control system causes the movable part(s) to stop, in response to one of the directional buttons being pressed, an indication of full retraction or extension is reached, an elapsed time period is reached or excessive motor current is reached.

Thus, the furniture motion control system according to at least some examples allows a user to select between multiple furniture movement operations (e.g., manual forward movement, automatic forward movement, manual backward movement, automatic backward movement, and stopping) using a simplified control interface (e.g., a two button control panel). Accordingly, the furniture motion control system provides a user with a relatively high degree of furniture movement control through a relatively simple control interface, thus increasing ease of use for the user, increasing the perceived speed of the act of moving the movable part(s) of the furniture member, and improving the user experience of the user. The furniture motion control system will now be discussed in greater detail below, with reference to FIGS. 1-4.

Referring now to FIG. 1, the furniture motion control system 100 may include a two button panel 110, control circuitry 120, a power unit 142, a motor 144, and an actuator 146.

As illustrated in FIG. 1, the two button panel 110 may include a forward button 114 and a backward button 116. The two button panel 110 may further include a USB port 112. The forward button 114 and a backward button 116 may each also be referred to as a "key" (e.g., the forward key 114 and the backward key 116) in the present specification.

The two button panel 110 may be included in a furniture control module, which is included in the furniture motion control system 100. For example, referring to FIGS. 1, 2A and 2B, first and second furniture control modules 200A and 200B are examples of a control module that may be included in the furniture motion control system 100. As is illustrated in FIGS. 2A and 2B, the furniture control modules 200A, 200B may each include the two button panel 110 and a power cord 220 that is electrically connected with the two button panel 110. The second furniture control module 200B further includes a dongle 230 that is electrically connected to the two button panel 110 via the power cord 220. According to at least some examples, the control circuitry 120 is inside the dongle 230 of FIG. 2B. For example, the dongle 230 may include a plastic housing that contains the control circuitry 120. The power cord 220 may convey power from the power unit 142 to the elements of the control circuitry 120. Additionally, the power cord 220 transmits signals (e.g., control signals) between one or more elements of the control circuitry 120 (e.g., the two relays-H bridge) and the motor 144 and/or power unit 142.

According to at least some examples, the furniture motion control system 100 may be included in a furniture member. FIGS. 3A-3C illustrate example furniture members in which the furniture motion control system 100 of FIG. 1 is installed according to at least some examples. FIGS. 3A-3C illustrate a first furniture member 310, a second furniture member 320 and a third furniture member 330. In the example illustrated in FIGS. 3A-3C, the first furniture member 310 is a sofa or couch, and the second and third furniture members 320 and 330 are chairs. The first through third furniture members 310-330 may each include movable parts. For example, as is illustrated in FIGS. 3A-3C, first through third furniture members 310-330 include stationary frames 12A, 12B and 12C and one or more movable leg rest platforms 14A, 14B and 14C that are supported by the stationary frames 12A, 12B and 12C and movable relative to the stationary frames 12A, 12B and 12C. According to at least some examples, additional movable parts that may be included in the first through third furniture members 310-330 include, but are not limited to, seatbacks, seat bottoms, seat cushions and armrests.

Figure 3:
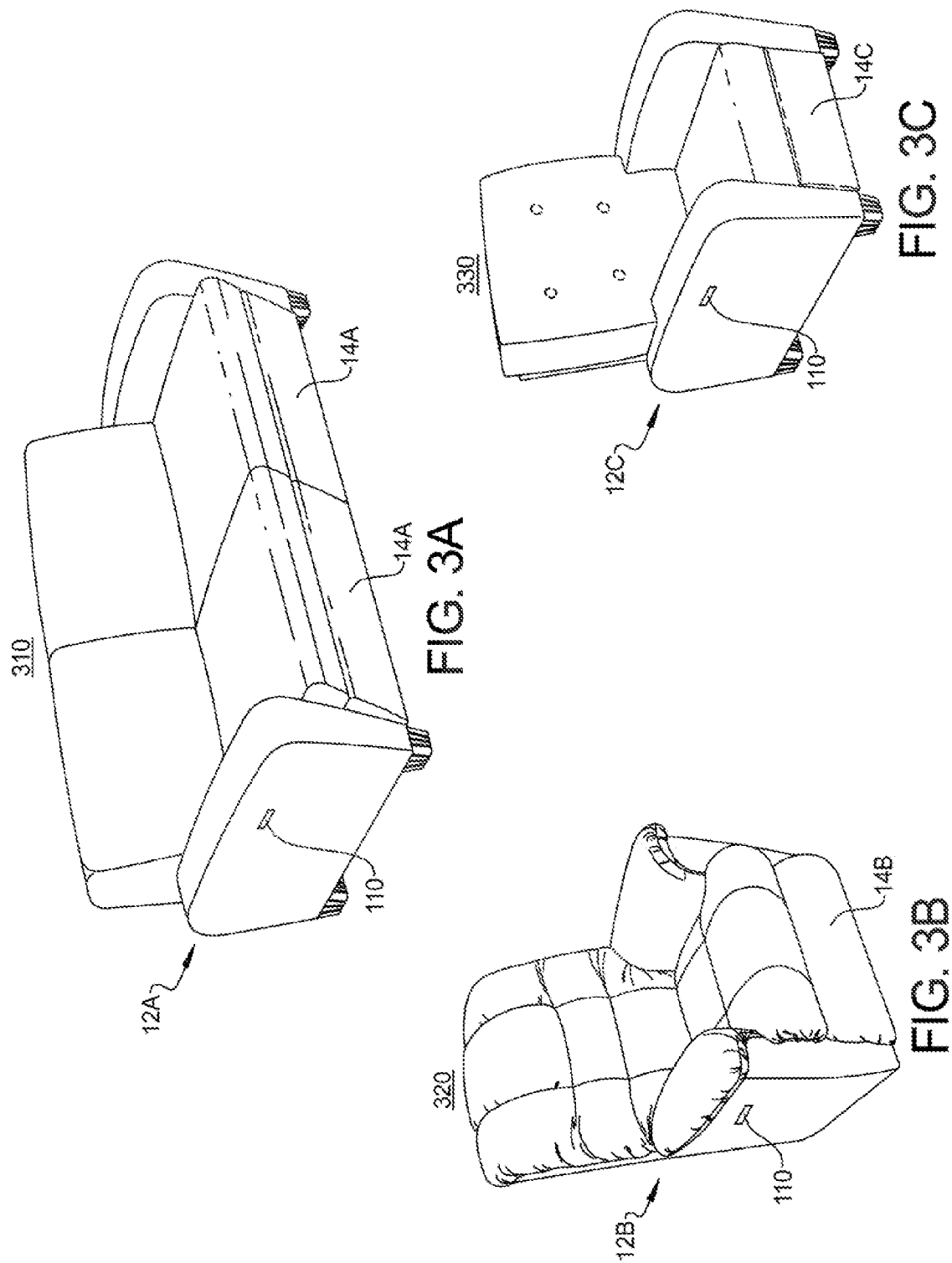
FIGS. 3A, 3B and 3C illustrate examples of furniture members in which the control system of FIG. 1 is installed according to at least some examples.

Referring to FIGS. 1-3B, the furniture motion control system 100 allows a user to use the two button panel 110 to control the movement of one or more movable parts of the first through third furniture members. For example, as is illustrated in FIGS. 3A-3B, the two button panel 110 of the furniture motion control system 100 may be located on an exterior portion of the first through third furniture members 310-330, where a user sitting in one of the first through third furniture members 310-330 may reach the two button panel 110 in order to manipulate the forward and/or backward buttons 114 and 116 of the two button panel 110, thereby controlling the one or more movable parts of a furniture member (e.g., movable leg rest platforms 14A, 14B and 14C of first through third furniture members 310-330) to move in a forward or backward direction. The manner in which the furniture motion control system 100 controls movement of a furniture member will now be discussed in greater detail below using the first furniture member 310 as an example.

Referring to FIGS. 1-3B, the control circuitry 120 of the furniture motion control system 100 controls the operation of the motor 144, which drives the actuator 146. Further, the actuator 146 controls the motion of one or more parts of the first furniture member 310. For example, in accordance with known methods and structures for driving the movement of movable parts of a furniture member with an electric motor, based on the direction in which the actuator 146 is driven (e.g., forwards or backwards), the actuator 146 may cause one or more parts of the first furniture member 310 to move. Examples of such movement of parts of the first furniture member 310 include, but are not limited to, extension and retraction of one or more of the movable leg rest platforms 14A of the first furniture member 310, and tilting (e.g., in a forward or backward direction) or reclining of one or more seatbacks and/or seatback cushions of the first furniture member 310.

For example, when the actuator 146 is driven to move in a forward direction, as the driving of the actuator 146 in the forward direction continues, one or more of the leg rest platforms 14A of the first furniture member may move, progressively, upwards and outwards from a retracted position to an extended position and/or a backrest of the first furniture member may move, progressively, from a relatively vertical position to a tilted position. As another example, when the actuator 146 is driven to move in a backward direction, as the driving of the actuator 146 in the backward direction continues, one or more of the leg rest platforms 14A of the first furniture member may move, progressively, downwards and inwards for an extended position to a retracted position and/or the backrest of the first furniture member may move, progressively, from a tilted position to a relatively vertical position.

The control circuitry 120 may include a microcontroller 121 that is electrically connected to a power supply 127, an input voltage measurement unit 129, and a motor control circuit 130. The motor control circuit may be embodied in a two relay circuit having a first relay R1 and a second relay R2 and an H-bridge H1 that are used to control the motor 144. Of course, various types of control circuits may be used including solid-state circuits.

Elements of the control circuitry 120 may each be embodied by a circuit or circuitry. According to at least some examples, the microcontroller 121 controls elements of the control circuitry 120 (e.g., the power supply 127, input voltage measurement unit 129, and the motor control circuit 130) generally. According to at least one example of the inventive concepts, the microcontroller 121 may include or be implemented by one or more circuits or circuitry (e.g., hardware) specifically structured to carry out and/or control some or all of the operations described in the present disclosure as being performed by the microcontroller 121, the control circuitry 120, or an element thereof. According to at least one example of the inventive concepts, the microcontroller 121 may include or be implemented by a memory 122 and one or more processors programmed to execute computer-readable code (e.g., software and/or firmware) that is stored in the memory 122 and includes instructions for causing the one or more processors to carry out and/or control some or all of the operations described in the present specification as being performed by the microcontroller 121, the control circuitry 120, or an element thereof. According to at least one example, the microcontroller 121 may be implemented by, for example, a combination of the above-referenced hardware and one or more processors executing computer-readable code. The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The power supply 127 may be electrically connected to the power unit 142. The motor control circuit 130 may be electrically connected to the motor 144. According to at least some examples, the microcontroller 121 may receive power from the power supply 127, and the power supply 127 may receive power from the power unit 142. According to at least some examples, the power unit 142 may be, for example, a power block or a battery pack. In the example illustrated in FIG. 1, the power supply 127 is a 5V DC power supply. However, at least some examples are not limited to the example illustrated in FIG. 1, and the voltage level of the voltage supplied by the power supply 127 may be any voltage level, and may be set in accordance with the preferences of a designer or manufacturer of the furniture motion control system 100.

According to at least some examples of the inventive concepts, the input voltage measurement unit 129 may include an analog to digital converter (ADC) that measures a voltage level of a voltage output by the power unit 142, and provides the measured voltage level to the microcontroller 121. In response to the measured voltage being above first voltage level threshold, the microcontroller 121 may provide an operating voltage to the USB port 112 and send an enable signal to the USB port 112 to enable the USB port 112 with the USB limiter circuit 123 in FIG. 1. The USB limiter 123 provides both enabling of the USB port with voltage and fault detection. In response to the measured voltage output by the input voltage measurement unit 129 being below a second voltage level threshold, the microcontroller 121 may not generate an operating voltage of the USB port 112 and may not generate an enable signal for enabling the USB port 112. As is illustrated in FIG. 1, for the purpose of simplicity, the operating voltage of the USB port 112 and the enable signal for enabling the USB port 112 may be referred to, collectively, as USB limiter 123. According to at least some examples, the microcontroller 121 may provide USB limiter with the voltage to supply the USB port 112 of the two button panel 110, as illustrated in FIG. 1. The USB limiter 123 may communicate a fault signal to the microcontroller when a fault is detected in the providing of voltage to the USB port 112. By way of example, when a short circuit or open circuit is detected a fault signal may be provided from the USB limiter 123 to the microcontroller 121. A USB outlet voltage measurement circuit 124 communicates a measured voltage signal to the microcontroller 121 corresponding to the USB voltage to the USB port 112. The fault signal from the USB limiter is derived therefrom.

According to at least some examples, the microcontroller 121 controls the motor control circuit 130, for example, by sending control signals to the two relays R1 and R2 and the H-bridge H1. Further, the motor control circuit 130 controls the motor 144 that, in turn, controls the motion of one or more movable parts of the first furniture member 310 by driving the actuator 146. According to at least some examples, the motor 144 is a DC electric motor, and the motor control circuit 130 controls the motor 144 to operate in one of multiple operation modes. The multiple operation modes of the motor 144 may include, for example, automatic forward movement mode, manual forward movement mode, automatic backward movement mode, manual backward movement mode, and no movement mode (or idle mode). Thus, the microcontroller 121 can control the movement and movement direction of one or more movable parts of the first furniture member 310 by controlling the motor control circuit 130.

According to at least some examples, the microcontroller 121 controls the operation of the motor 144, and thus, the movement of one or more movable parts of the first furniture member 310, in accordance with an algorithm defined by control logic 125 (FIG. 1). According to at least some examples, the control logic 125 is a direct scan, two buttons 5V logic. Control logic 125 may be embodied by one or both of circuitry and computer-executable instructions (e.g., software and/or firmware) included or stored in the microcontroller 121. An example of the algorithm defined by control logic 125 will now be discussed below with reference to FIG. 4.

A motor current sense 132 is used to determine the current through the motor 144 and allow the controller to function in different ways in response to the sensed current. The motor current sense 132 may be implemented in a variety of ways. In one example, the motor current sense 132 is implemented in a sensor using a bank of current sense resistors on a PC board through which the motor current is communicated. Then, the voltage of the resistor bank is measured using the analog-to digital converter of the microcontroller 121. The motor current is derived from the converted voltage reading. With respect to control functions, current sensing is used to determine when to stop driving the relays that control the actuator. During automatic movement, when current is detected as at or near zero, full extension or retraction of the actuator 146 is determined, and the microcontroller will turn off the relays R1, R2 of the motor control circuit 130. If during any movement, if an excessive amount of current is detected as sensed by the motor current sense 132, the relays R1, R2 in the motor control circuit 130 are turned off to stop motion, as there is likely an obstruction in the mechanism or some other issue.

A timer 134 is also in communication with the microcontroller 121. The timer 134 is used to time various time periods. For example, the timer 134 may begin counting an elapsed time period from when a button is pushed and may cease when the same button is released. That is, a button push signal may start the timer and the button release signal may stop the timer. The elapsed time period determined by the timer may be used to control a function such as whether to enter an automatic mode or remain in a manual mode.

Figure 4:
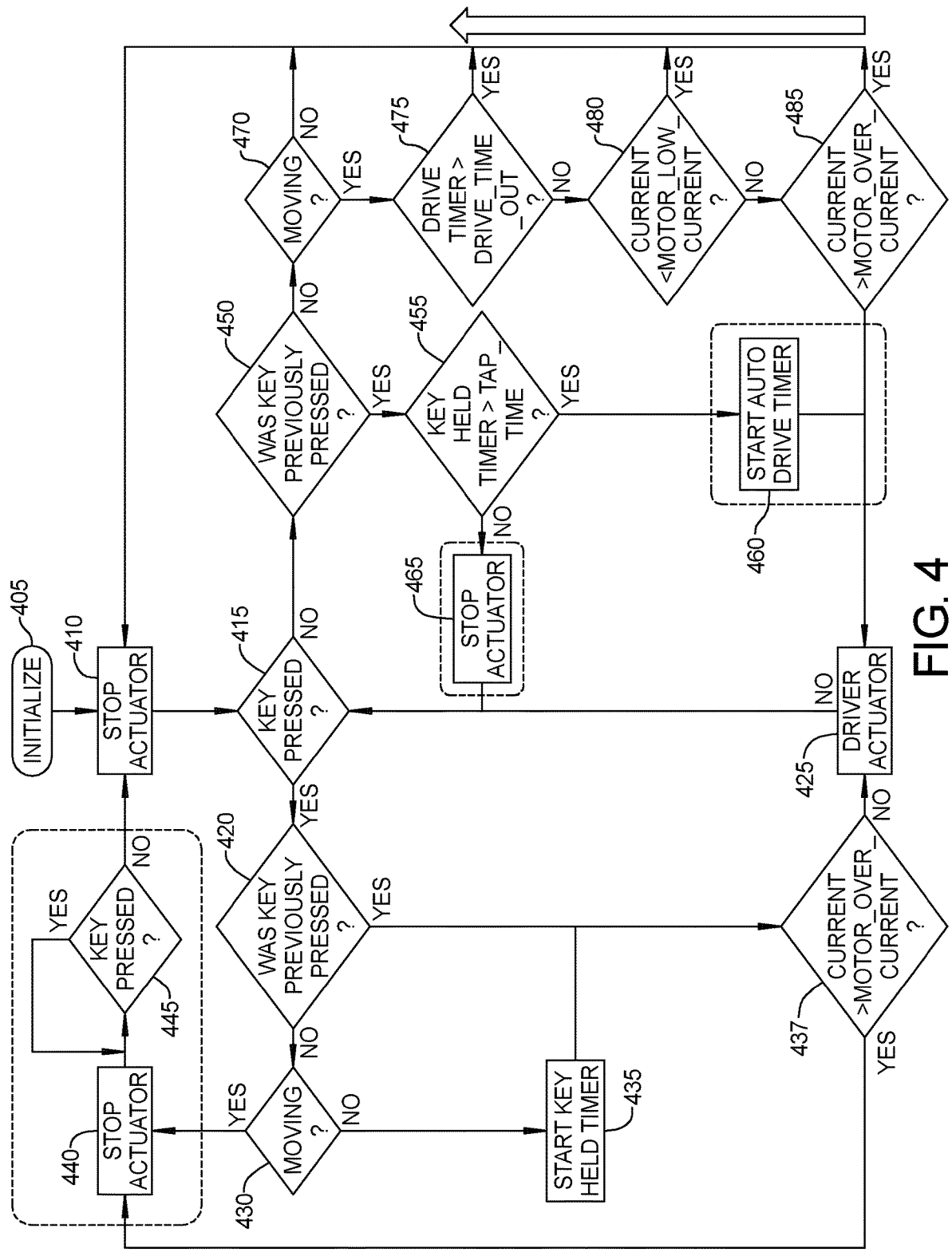
FIG. 4 illustrates an example furniture motion control algorithm according to at least some examples.

Referring now to FIG. 4, an example furniture motion control algorithm according to at least some examples is shown. The furniture motion control algorithm is defined by the control logic 125 and executed by the microcontroller 121. Thus, according to at least some examples, any or all operations described with reference to FIG. 4 may be performed, or controlled, by the microcontroller 121.

The furniture motion control algorithm is initialized in operation 405. According to at least some examples, when the algorithm is initialized in operation 405, the actuator 146 begins in a stopped state in operation 410. After operation 410, the algorithm determines whether or not a key (e.g., forward button 114 or backward button 116) has been pressed in operation 415. According to at least some examples, operation 415 may include the microcontroller 121 periodically scanning for signals from the two button panel 110 indicating that the forward button 114 or backward button 116 has been pressed. Various furniture movement operations will now be discussed.

For example, for a manual furniture movement operation scenario or an automatic furniture movement operation scenario, the algorithm determines in operation 415 that a button was pressed during a current scan (e.g., the microcontroller 121 detects that one of the forward or backward buttons 114 and 116 has been pressed during a current scan) and proceeds to operation 420.

In operation 420, the algorithm determines whether the button pressed in operation 415 was previously pressed. For example, the microcontroller 121 determines whether the button that was detected as being pressed during the current scan was detected as having been pressed during a previous scan. For the manual movement operation scenario, the algorithm determines, in operation 420, that the button pressed in operation 415 was not previously pressed. Thus, the algorithm proceeds to operation 430 and determines whether movement is currently occurring (e.g., the microcontroller 121 determines whether the actuator 146 is currently being driven by the motor 144). For the manual furniture movement operation scenario or the automatic furniture movement operation scenario, the algorithm determines that movement is not currently occurring during a first instance of operation 430. Thus, the algorithm proceeds to operation 435. In operation 435, a key held timer is started. For example, the microcontroller 121 may start the timer 134 for tracking an amount of time that a key (e.g., forward button 114 or backward button 116) is held.

After step operation 420 when the key was previously pressed and after operation 435, the algorithm proceeds to operation 437. In operation 437, the current through the motor 144 determined by the motor current sense 132 and the microcontroller 121 is compared to a motor current threshold (MOTOR_OVER_CURRENT). When the motor current is not greater than the motor current threshold, the algorithm proceeds to operation 425 and the microcontroller 121 begins driving the actuator 146 by setting an operating mode (e.g., forward movement mode or backward movement mode) in accordance with a direction (e.g., forward or backward) associated with the button that was detected as being pressed during the current scan.

The algorithm then proceeds back to operation 415 a second time. For example, the microcontroller 121 may scan, again, for signals indicating that that a key (e.g., forward button 114 or backward button 116) is being pressed. At this point, operation of the algorithm differs depending on a type of furniture movement operation being performed.

Manual Furniture Movement Operation

For the manual movement operation scenario, the algorithm determines that a key is currently being pressed in the current iteration of operation 415 and proceeds to operation 420. In operation 420, the algorithm determines that the key detected as having been pressed during the previous scan (i.e., during the previous iteration of operation 415) is still being pressed during the current scan. Consequently, the algorithm proceeds to operation 425, and thus, continues to drive the actuator 146 before proceeding to operation 415 a third time.

As is illustrated in FIG. 4, for the manual movement operation scenario, the algorithm will continue iterating through operations 415, 420, 430, 435, 437 and 425 (thus, continuously driving the actuator 146) until the key (e.g., the forward button 114 or backward button 116) is released. Specifically, when the key is released, the algorithm will determine, in operation 415, that the key is not being pressed during a current scan. Thus, the algorithm will then proceed to operation 450 and determine that the key was pressed during a previous scan. As a result, the algorithm will proceed to operation 455. In operation 455, the algorithm will determine whether a current value of the key held timer (which was started during operation 435) is greater than a key held threshold value (TAP_TIME). According to at least some examples, the key held threshold value is 250 ms. In the manual movement operation scenario, the algorithm will determine, in operation 455, that the current key held time is not greater than the key held threshold value. Thus, the algorithm will proceed to operation 465 and stop the actuator 146 before returning to operation 415 again.

Automatic Furniture Movement Operation

For the automatic movement operation scenario, during the second iteration of operation 415, the algorithm may determine that a key is not currently being pressed, and thus, proceed to operation 450. For the automatic furniture movement operation scenario, the algorithm determines, in operation 450, that a key was pressed during a previous scan and proceed to operation 455. In operation 455, the algorithm will determine whether of current value of the key held timer (which was started during operation 435) is less than the key held threshold value. In the automatic movement operation scenario, the algorithm will determine, in operation 455, that the current key held time is greater than the key held threshold value. Thus, the algorithm will proceed to operation 460 and start an auto drive timer. After operation 460, the algorithm proceeds to operation 425, and thus, continues to drive the actuator 146 before proceeding to operation 415 a third time.

During the third iteration of operation 415, the microcontroller 121 may scan, again, for signals indicating that that a key (e.g., forward button 114 or backward button 116) is being pressed. For the automatic motion control scenario, the algorithm determines that a key is not currently being pressed, and thus, proceeds to operation 450 a second time. During the second iteration of operation 450, the algorithm determines that a key was not detected as having been pressed during a previous scan. Thus, the algorithm proceeds to operation 470 and determines whether or not movement is currently occurring. For the present automatic movement scenario, the algorithm will determine that the movement is occurring (e.g., the microcontroller 121 determines that the actuator 146 is currently being driven by the motor 144). Thus, the algorithm proceeds to operation 475. In operation 475, the algorithm determines whether a current value of the auto drive timer (which was started in operation 460) exceeds an automatic (auto) drive threshold value (DRIVE_TIME_OUT). According to at least some examples, the auto drive threshold value is 15 s. When the auto drive threshold value is not exceeded in operation 475, operation 480 determines whether the motor current is less than a low motor current threshold (MOTOR_CURRENT_LOW). When operation 450 is not less than the low motor current threshold, operation 485 is executed. In operation 485 the motor current is compared to an overcurrent threshold (MOTOR_OVER_CURRENT). When the over current threshold is not exceeded, the algorithm proceeds from operation 485 back to operation 425 continuing the driving of the actuator 146.

When the auto drive threshold value is exceeded in operation 475, the current is lower than the motor low current threshold in operation 480 or the motor current is greater than the overcurrrent threshold in operation 485, the algorithm proceeds from operations 475, 480 and 485, respectively, back to operation 410 to stop the actuator. As is illustrated in FIG. 4, during the present automatic movement operation scenario, the algorithm will continue iterating through operations 415, 450, 470, 475, 480, 485 and 425 (thus continuously driving the actuator 146) until one of the stop conditions in operations 475, 480 and 485 is reached such as the timer value exceeding the auto drive threshold value or the low current threshold or overcurrrent threshold is crossed by the motor current. An example of an automatic movement stopping operation will now be discussed below.

For example, in the present automatic movement operation scenario, if the microcontroller 121 detects a key (e.g., the forward button 114 or backward button 116) being pressed after the initial pressing of a key for less than the key held threshold value and before the auto drive threshold value is exceeded, the algorithm will determine in operation 415 that a key has been pressed. Thus, the algorithm will proceed from operation 415 to 420. In operation 420, the algorithm will determine that a key was not previously pressed (e.g., the microcontroller 121 will determine that the key detected as being pressed during a current scan was not detected as being pressed during the previous scan). Thus, the algorithm proceeds to operation 430. For the present automatic movement operation scenario, in operation 430, the algorithm determines that movement is currently occurring (e.g., the microcontroller 121 determines that the actuator 146 is currently being driven by the motor 144) because automatic movement of the actuator 146 is still occurring. Accordingly, the algorithm proceeds from operation 430 to 440, thus stopping the actuator 146. The algorithm is also stopped at operation 440 when operation 437 determines the motors current is over the motor overcurrent threshold. The algorithm then proceeds to operation 445. The algorithm loops through the operation 445 until the key that was pressed to stop the automatic movement of the actuator 146

(e.g., the forward button 114 or backward button 116) is released. Next, the algorithm returns to operation 410 before proceeding to operation 415 another time.

Though the furniture movement control algorithm according to at least some examples is discussed above with reference to an example in which a value of the key held threshold (e.g., 455) is 250 milliseconds and a value of the auto drive threshold (e.g., 475) is 15 s, values of the key held threshold and/or the auto drive threshold may be, for example, set in accordance with the preferences of a user, designer and/or manufacturer of the furniture motion control system 100. For example, values of the key held threshold and/or the auto drive threshold may be software variables or firmware variables stored in memory 122 included in the microcontroller 121 or the control circuitry 120, or variables stored in one or more registers of the control circuitry 120 (e.g., registers included in the microcontroller 121).

Figure 5:
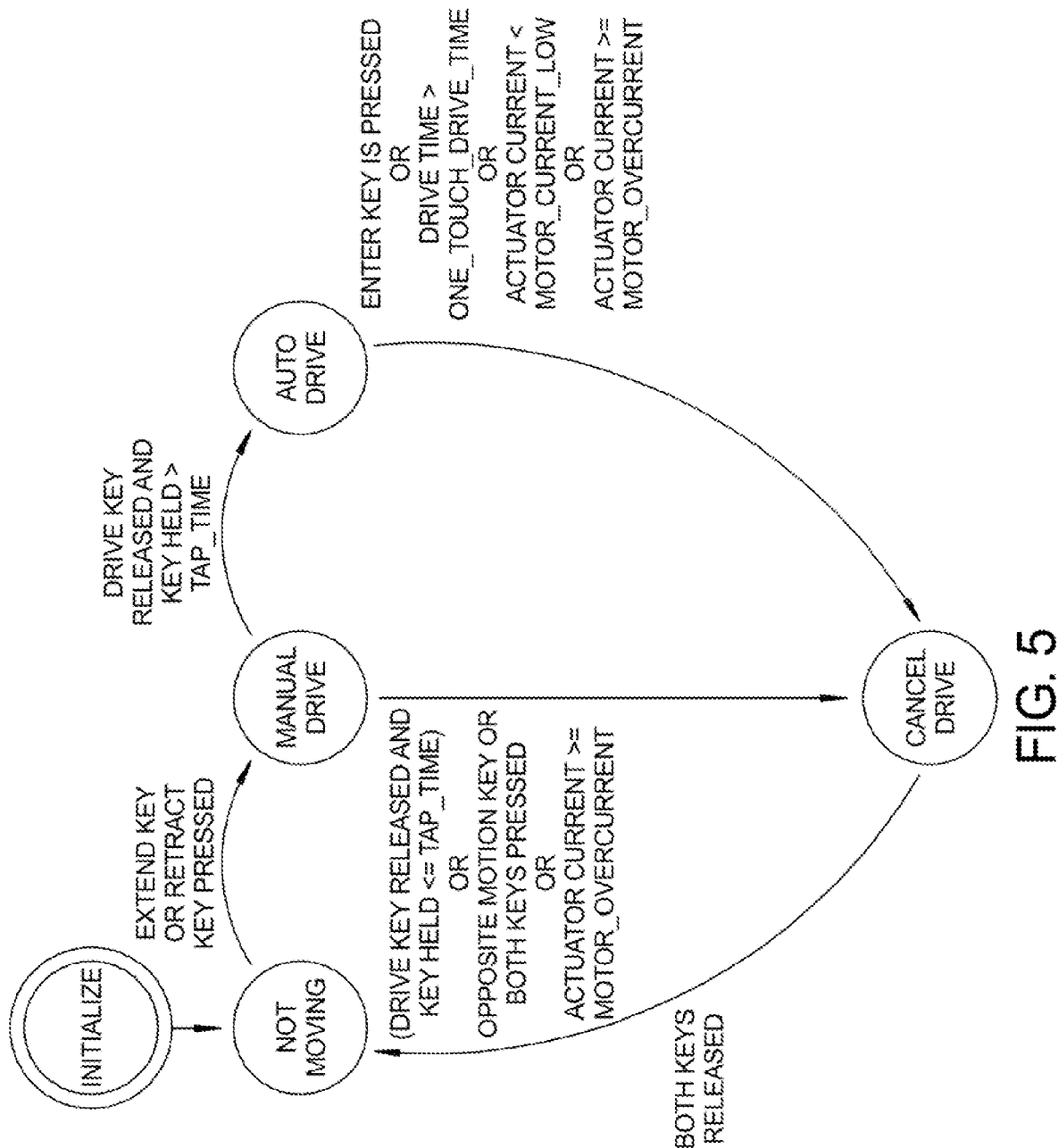
FIG. 5 is a state machine diagram illustrating a furniture motion control algorithm.

FIG. 5 is a state machine diagram illustrating a furniture motion control algorithm. The furniture motion control algorithm may be defined by the control logic 125 and executed by the microcontroller 121. Thus, according to at least some examples, any or all operations described with reference to FIG. 5 may be performed, or controlled, by the microcontroller 121.

Referring to FIG. 5, the furniture motion control algorithm is initialized in the NotMoving state in which the motor 144 is not driving the actuator 146. In response to a key (e.g., the extend or forward button 114 or the retract or backward button 116) being pressed, the algorithm transitions to the manual drive state ManualDrive.

In the ManualDrive state, the motor 144 drives the actuator 146 in accordance with a direction corresponding to the pressed key. If the key is held for greater than the key held threshold (e.g., TAP_TIME), the algorithm transitions from the ManualDrive state to the AutoDrive state.

In the AutoDrive state, the motor 144 drives the actuator 146 in accordance with a direction corresponding to the key that was just pressed and released, and continues driving the actuator 146 until a stop condition is met. The stop conditions in this example includes at least one key being pressed OR until a drive time (e.g., a value of an auto drive timer) exceeds a threshold (e.g., an auto drive threshold or ONE_TOUCH_DRIVE_TIME) OR the current falls below the low motor current threshold (MOTOR_CURRENT_LOW) OR the motor current is above the motor overcurrent threshold (MOTOR_OVERCURRENT). If, while in the AutoDrive state, at least one key is pressed, the drive time exceeds the drive time threshold value (e.g., ONE_TOUCH_DRIVE_TIME) the motor current is below a low current threshold or the motor current is above a motor overcurrent threshold, the algorithm transitions to the CancelDrive state.

In the CancelDrive state, like the NotMoving state, the motor 144 does not drive the actuator 146. Once both keys are released, the algorithm transitions from the CancelDrive state to the NotMoving state.

The algorithm can also transition to CancelDrive state directly from the ManualDrive state in response to the drive key being released and the key held time being less than or equal to the key held threshold OR both keys being pressed or in response to the other key (i.e., the other than the initially pressed key) being pressed OR when the motor current is greater than the overcurrent threshold. The control moves from the CancelDrive state to the NotMoving state as described above.

Figure 6:
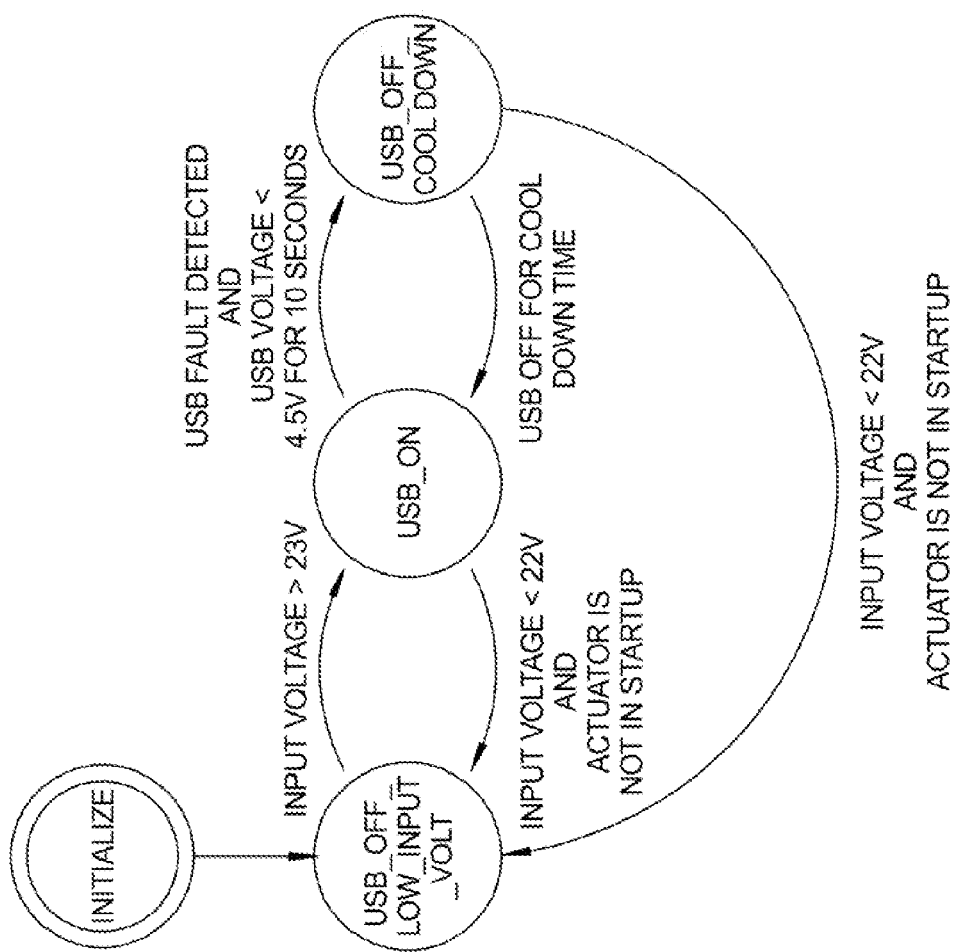
FIG. 6 is a state machine diagram illustrating a USB control algorithm.

FIG. 6 is a state machine diagram illustrating a USB control algorithm. The USB control algorithm illustrated in FIG. 6 may be defined by the control logic 125 and executed by the microcontroller 121. Thus, according to at least some examples, any or all operations described with reference to FIG. 6 may be performed, or controlled, by the microcontroller 121.

Referring to FIG. 6, the algorithm may be initialized in the off state USB_OFF_LOW_INPUT_VOLT, in which power is not supplied to the USB port 112. In the USB_OFF_LOW_INPUT_VOLT, the input voltage of control circuitry 120 is monitored (e.g., by the input voltage measurement unit 129). In response to the input voltage exceeding a first voltage threshold (e.g., 23V), the algorithm transitions to the USB_ON state.

In the USB_ON state, an operating voltage is supplied to the USB port 112 and the USB port 112 is enabled for operation until the input voltage fall below a second voltage threshold (e.g., 22V) AND the actuator is not in a startup mode. If, while in the USB_ON state, the input voltage falls below a second voltage threshold (e.g., 22V) and the actuator is not in a startup mode, the algorithm returns to the USB_OFF_LOW_INPUT_VOLT state. If, while in the USB_ON state, a USB fault is detected AND the USB voltage is less than a USB voltage threshold for at least a predetermined amount of time (a fault threshold time), the algorithm transitions to the USB_OFF_COOL_DOWN state. For example, according to at least some examples, the control circuitry 120 may include a USB current limiting switch circuit, which is capable of indicating whether or not a USB fault exists. For example, the USB current limiting switch may include a fault pin, and the microcontroller 121 may monitor the fault pin of the USB current limiting switch circuit to determine whether or not a USB fault exists. According to at least some examples, the USB current limiting switch circuit may indicate that a USB fault exists when the USB current limiting switch circuit determines that an overcurrent condition exists for longer than the fault threshold time. In addition, the other condition that is true to enter the USB_OFF_COOL_DOWN state is when the microcontroller 121 determines by way of the USB output voltage measurement circuit 124 that the USB voltage is less than the USB voltage threshold of 4.5 Volts, in this example, for a predetermined amount of time such as 10 seconds.

In the USB_OFF_COOL_DOWN state, an operating voltage is supplied to the USB port 112 and the USB port 112 is enabled for operation. While in the USB_OFF_COOL_DOWN state, if the input voltage falls below the second voltage threshold (e.g., 22V) AND the actuator is not in the startup mode, the algorithm returns to the USB_OFF_LOW_INPUT_VOLT state. Alternatively, in the USB_OFF_COOL_DOWN state, when the USB port 112 is turned off for a cool down time, the algorithm returns to the USB_ON state.

According to at least some examples, in response to detecting a USB fault, the USB current limiting circuit lowers the USB output voltage. According to at least some examples, when the USB output voltage is lowered, a temperature of the USB current limiting circuit may increase to undesirable levels over time. Thus, the USB current limiting circuit is prevented from becoming too hot, which is a state in which the USB port 112 is turned off thereby beginning a period of cooling down. If, while in the OVERLOAD state, the input voltage drops below the second voltage threshold (e.g., 22V), the algorithm returns to the USB_OFF_LOW_INPUT_VOLT state.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A furniture motion control system for controlling movement of one or more movable parts of a furniture member, the system comprising:
   a panel including one or more buttons;
   an actuator configured to control movement of the one or more movable parts of the furniture member;
   an electric motor configured to drive the actuator; and
   control circuitry configured to control the electric motor,
   wherein the control circuitry is configured to, in response to detecting that a first button from among the one or more buttons has been pressed, select between controlling the motor to drive the actuator and the one or more movable parts to move automatically and controlling the motor to drive the actuator and the one or more movable parts to move manually, based on a length of time the first button is held,
      wherein, in response to the control circuitry detecting that the first button has been pressed and held for the first length of time that is less than a threshold value, the control circuitry is configured to control the motor to drive the actuator while the first button is held and to stop the actuator when the first button is released, and
      wherein, in response to the control circuity detecting that the first button has been pressed and released after being held for a second length for time that is greater than the threshold value, the control circuitry is configured to control the motor to continue driving the actuator after the first button is released and to stop movement of the actuator when the control circuitry determines that the first button has been pressed again while the actuator is moving.

2. The system of claim 1,
   wherein the control circuitry is configured to, in response to determining that the first button is pressed, initiate a timer to determine the length of time the first button is pressed and control the motor to drive the actuator to move the one or more movable parts.

3. The system of claim 1 wherein the control circuitry is configured to, when the control circuitry controls the motor to continue driving the actuator and the one or more movable parts after the first button is released, continue driving the actuator until a first period of time has elapsed unless the first button has been pressed again while the actuator is moving.

4. The system of claim 1 wherein the control circuitry is configured to, when the control circuitry controls the motor to continue driving the actuator and the one or more movable parts after the first button is released, continue driving the actuator until the control circuitry detects the actuator is fully extended or retracted unless the first button has been pressed again while the actuator is moving.

5. The system of claim 1 wherein the control circuitry is configured to, when the control circuitry controls the motor to continue driving the actuator and the one or more movable parts after the first button is released, continue driving the actuator until the control circuitry detects the motor current is greater than an overcurrent threshold unless the first button has been pressed again while the actuator is moving.

6. The system of claim 1 wherein the control circuitry is configured to, when the control circuitry controls the motor to continue driving the actuator and the one or more movable parts after the first button is released, continue driving the actuator until the control circuitry detects the motor current is less than a low current threshold unless the first button has been pressed again while the actuator is moving.

7. The system of claim 1,
   wherein the one or more buttons include a forward button and a backward button,
   wherein the first button is the forward button or the backward button,
   wherein the control circuitry is configured to, in response to determining that the forward button was pressed and the length of time the forward button is held is greater than the threshold value, control the motor to drive the actuator and the one or more movable parts to move automatically, in a forward direction, and
   wherein the control circuitry is configured to, in response to determining that the backward button was pressed and the length of time the backward button is held is greater than the threshold value, control the motor to drive the actuator and the one or more movable parts to move automatically, in a backward direction.

8. The system of claim 7,
   wherein the control circuitry is configured to, in response to determining that the length of time the first button is held is less than the threshold value, control the motor to drive the actuator and the one or more movable parts to move manually and stops in response to the first button being released.

9. The system of claim 1,
   wherein the one or more buttons include a forward button and a backward button,
   wherein the first button is the forward button or the backward button,
   wherein the control circuitry is configured to, in response to determining that the forward button was pressed and the length of time the forward button is held is less than the threshold value, control the motor to drive the actuator and the one or more movable parts to move manually, in a forward direction, and
   wherein the control circuitry is configured to, in response to determining that the backward button was pressed and the length of time the backward button is held is less than the threshold value, control the motor to drive the actuator and the one or more movable parts to move manually, in a backward direction.

10. A furniture member comprising:
    a seatback;
    a seat bottom;
    a stationary frame supporting the seatback and the seat bottom, wherein the seatback is movable relative to the seat bottom and the stationary frame;
    at least one movable leg rest platform that is supported by the stationary frame and movable relative to the stationary frame; and
    a furniture motion control system including:
       a panel mounted including a first button and a second button;
       an actuator configured to control movement of the seatback;
       an electric motor configured to drive the actuator; and
       control circuitry configured to control the electric motor, wherein, in response to the control circuitry detecting that the first button has been pressed, the control circuitry is configured to control the motor to begin driving the actuator, wherein, in response to the control circuitry detecting that the first button has been pressed and held for a first length of time that is less than a threshold value, the control circuitry is configured to control the motor to drive the actuator while the first button is held and to stop the actuator when the first button is released, and wherein, in response to the control circuitry detecting that the first button has been pressed and released after being held for a second length of time that is greater than the threshold value, the control circuitry is configured to control the motor to continue driving the actuator after the first button is released and to stop movement of the actuator when the control circuitry determines that the first button has been pressed again while the actuator is moving.

11. The furniture member of claim 10, wherein the control circuitry is configured to, in response to determining that the first button was pressed, released and held for the second the length of time, control the motor to drive the actuator to move automatically and stop movement of the actuator when the control circuitry determines that:

the control circuitry detects that a motor current is greater than an overcurrent threshold or the control circuitry detects that the motor current is less than a low current threshold.

12. The furniture member of claim 10, wherein the first button causes movement of the seatback in a first direction and the second button causes movement of the seatback in a second direction opposite the first direction, and wherein the control circuitry is configured to, in response to determining that the second button was pressed and released after being held for the second length of time, control the motor to drive the actuator the second direction.

13. The furniture member of claim 12, wherein the control circuitry is configured to, in response to determining that the second button was pressed and released after being held for a length of time that is less than the threshold value, control the motor to stop the actuator when the second button is released.

14. A method of operating a furniture motion control system for controlling movement of one or more movable parts of a furniture member, the system including a panel including a first button and a second button, an actuator configured to control movement of the one or more movable parts of the furniture member, an electric motor configured to drive the actuator, and control circuitry configured to control the electric motor, the method comprising:

wherein, in response to the control circuitry detecting that the first button has been pressed and held for the first length of time that is less than a threshold value, controlling the motor to drive the actuator while the first button is held and to stop the actuator when the first button is released, and wherein, in response to the control circuity detecting that the first button has been pressed and released after being held for a second length for time that is greater than the threshold value, controlling the motor to continue driving the actuator after the first button is released and to stop movement of the actuator when the control circuitry determines that the first button has been pressed again while the actuator is moving.

15. The method of claim 14 wherein the control circuitry is configured to, in response to determining that the first button was pressed, released and held for the second the length of time, control the motor to drive the actuator to move automatically and stop movement of the actuator when the control circuitry determines that:

the control circuitry detects that a motor current is greater than an overcurrent threshold or the control circuitry detects that the motor current is less than a low current threshold.

16. The method of claim 14, wherein the first button causes movement of the seatback in a first direction and the second button causes movement of the seatback in a second direction opposite the first direction, and wherein the control circuitry is configured to, in response to determining that the second button was pressed and released after being held for the second length of time, control the motor to drive the actuator the second direction.

17. The method of claim 16, wherein the control circuitry is configured to, in response to determining that the second button was pressed and released after being held for a length of time that is less than the threshold value, control the motor to stop the actuator when the second button is released.

* * * * *